United States Patent [19]

Kleinschmit et al.

[11] 4,297,143
[45] Oct. 27, 1981

[54] TEMPERATURE STABILIZED SILICON DIOXIDE-MIXED OXIDE, THE PROCESS FOR ITS PRODUCTION AND USE

[75] Inventors: Peter Kleinschmit, Hanau; Rudolf Schwarz, Alzenau, both of Fed. Rep. of Germany

[73] Assignee: Degussa Aktiengesellschaft, Frankfurt, Fed. Rep. of Germany

[21] Appl. No.: 174,341

[22] Filed: Jul. 31, 1980

[30] Foreign Application Priority Data

Aug. 6, 1979 [DE] Fed. Rep. of Germany ....... 2931810

[51] Int. Cl.³ .................. C04B 35/14; C01B 33/12
[52] U.S. Cl. .................................... 501/103; 423/275; 423/336; 423/337; 501/126
[58] Field of Search ............... 423/265, 275, 336, 337; 106/69, 73.5

[56] References Cited

U.S. PATENT DOCUMENTS 3,848,152 11/1974 Schultz .................................. 106/52
3,954,945 5/1976 Lange et al. ........................ 423/336
4,047,966 7/1977 Bihuniak et al. .................... 106/73.5
4,067,954 1/1978 Völling .............................. 423/336

FOREIGN PATENT DOCUMENTS 1671186 9/1971 Fed. Rep. of Germany .
2036124 12/1971 Fed. Rep. of Germany .
1121278 7/1968 United Kingdom ................ 423/337
1121279 7/1968 United Kingdom ................ 423/337

Primary Examiner—O. R. Vertiz
Assistant Examiner—Mark Bell
Attorney, Agent, or Firm—Cushman, Darby & Cushman

[57] ABSTRACT

There is prepared pyrogenically produced silicon dioxide-mixed oxide having a BET surface area of 50 to 400 m²/g which contains as a constituent of the mixed oxide:
0.01 to 10 weight % zirconium dioxide or
0.01 to 10 weight % iron oxide (ferric oxide) or
0.01 to 9.9 weight % titanium dioxide.

Because of the doping with the foreign oxide the silicon dioxide-mixed oxide is more temperature stable than the undoped silicon dioxide. The product can be used as thermal insulation either as unpressed material in free bulk form or as a compacted mixture.

26 Claims, 3 Drawing Figures

1 MICRON

1 MICRON

1 MICRON

TEMPERATURE STABILIZED SILICON DIOXIDE-MIXED OXIDE, THE PROCESS FOR ITS PRODUCTION AND USE

BACKGROUND OF THE INVENTION

Synthetic silica either in the form of silica aerogel or as a precipitated silica is used as a constituent of thermal insulating materials.

Thus German AS No. 2036124 (acknowledging British application No. 28052, filed June 10, 1970) describes an insulating sheet which consists of a permeable jacket of glass fiber fabric or cotton and silica aerogel which is mixed with a turbidity agent such as titanium dioxide.

The German AS No. 1671186 (acknowledging British application No. 43668, filed Sept. 29, 1966) describes a process for the production of a thermal insulating material consisting of an aerogel based on silica, aluminum silicate and a turbidity agent.

These known thermal insulating mixtures have the disadvantage that their use is limited by the temperature instability of the $SiO_2$ components. Thus the specific surface area, for example, of a pyrogenic silica steadily decreases with increasing temperature beginning with 550° C. and the silica particle size decreases at about 950° C. through which the desired thermal insulation capacity is drastically decreased.

SUMMARY OF THE INVENTION

The invention is directed to a pyrogenically produced, temperature stabilized silicon dioxide mixed oxide having a BET surface area of 50 to 400 m/$^2$g which contains as a constituent:
0.01 to 10 weight % zirconium dioxide or
0.1 to 10 weight % iron oxide or
0.1 to 9.9 weight % titanium dioxide.

As iron oxide the silicon dioxide-mixed oxide contains $Fe_2O_3$.

The silicon-mixed oxide of the invention can be heated to a temperature of 1150° C. without there being detected an increased coarseness of the oxide particles by optical electron absorption.

The invention is further directed to a process for the production of pyrogenically produced silicon dioxide-mixed oxides having a BET surface area of 50 to 400 m$^2$/g which contains as a constituent:
0.01 to 10 weight % zirconium dioxide
0.1 to 10 weight % iron oxide or
0.1 to 9.9 weight % titanium dioxide which is characterized by vaporizing silicon tetrachloride, diluting it with preheated air, supplying the mixture to a known type of burner, mixing it there with hydrogen and with the vaporous chloride of iron, titanium or zirconium in such ratio that the correspondingly composed silicon dioxide-mixed oxide results, burning the 4-component mixture in a reaction chamber, separating the solid silicon dioxide-mixed oxide obtained thereby from the gaseous reaction products by means of a known apparatus and freeing from adhering hydrogen chloride by heating in moist air.

Generally the ratio of silicon tetrachloride to air is 0.5 to 1.2 kg of silicon tetrachloride to 0.8 to 1.2 Nm$^3$ of air, preferably 0.8 to 0.95 kg of silicon tetrachloride to 0.9 to 1.1 Nm$^3$ air. The air is generally heated to 120° to 180° C.

Generally the ratio of hydrogen to the total of silicon tetrachloride and the chloride of the other element is 0.8 to 1.5 Nm$^3$ of hydrogen to 2.8 to 3.3 kg of total chlorides, preferably 0.9 to 1.2 Nm$^3$ of hydrogen to 2.9 to 3.1 kg of total chlorides.

The pyrogenically produced temperature stabilized silicon dioxide-mixed oxide can be used to produce thermal insulating materials.

Thus there can be used thermal insulating mixtures as described in German AS No. 2036124 and German AS No. 1671186.

The silicon dioxide-mixed oxide, however, can also be used without further ingredients in loose bulk from the thermal insulation.

Unless otherwise indicated all parts and percentages are by weight.

The composition can comprise, consist essentially of or consist of the stated materials. The process can comprise, consist essentially of or consist of the stated steps.

The invention will be further explained in connection with the following examples.

Detailed Description

EXAMPLE 1

(Comparison Example for Mixed Oxide Free $SiO_2$)

There were vaporized in a falling film evaporator 6.3 kg per hour of silicon tetrachloride and it was diluted with 7.15 m$^3$/h of air which had been preheated to 120° C. There was added to the vapor-air mixture in the mixing chamber of a burner customarily used in the production of pyrogenic materials 2.1 m$^3$/h of hydrogen. The homogeneous mixture of the three components left the orifice of the burner with a velocity of about 40 m/sec. and burned in a reaction chamber. Then the reaction product was cooled to about 130° C. After the separation of the silica from the volatile hydrogen chloride containing gases in filters or cyclones, in a given case residual adhering hydrogen chloride was removed by repeated heating in moist air to about 600° C. The silica had a BET surface area of 300 m$^2$/g and an average size of primary particles of 7 nm.

Figure 1:
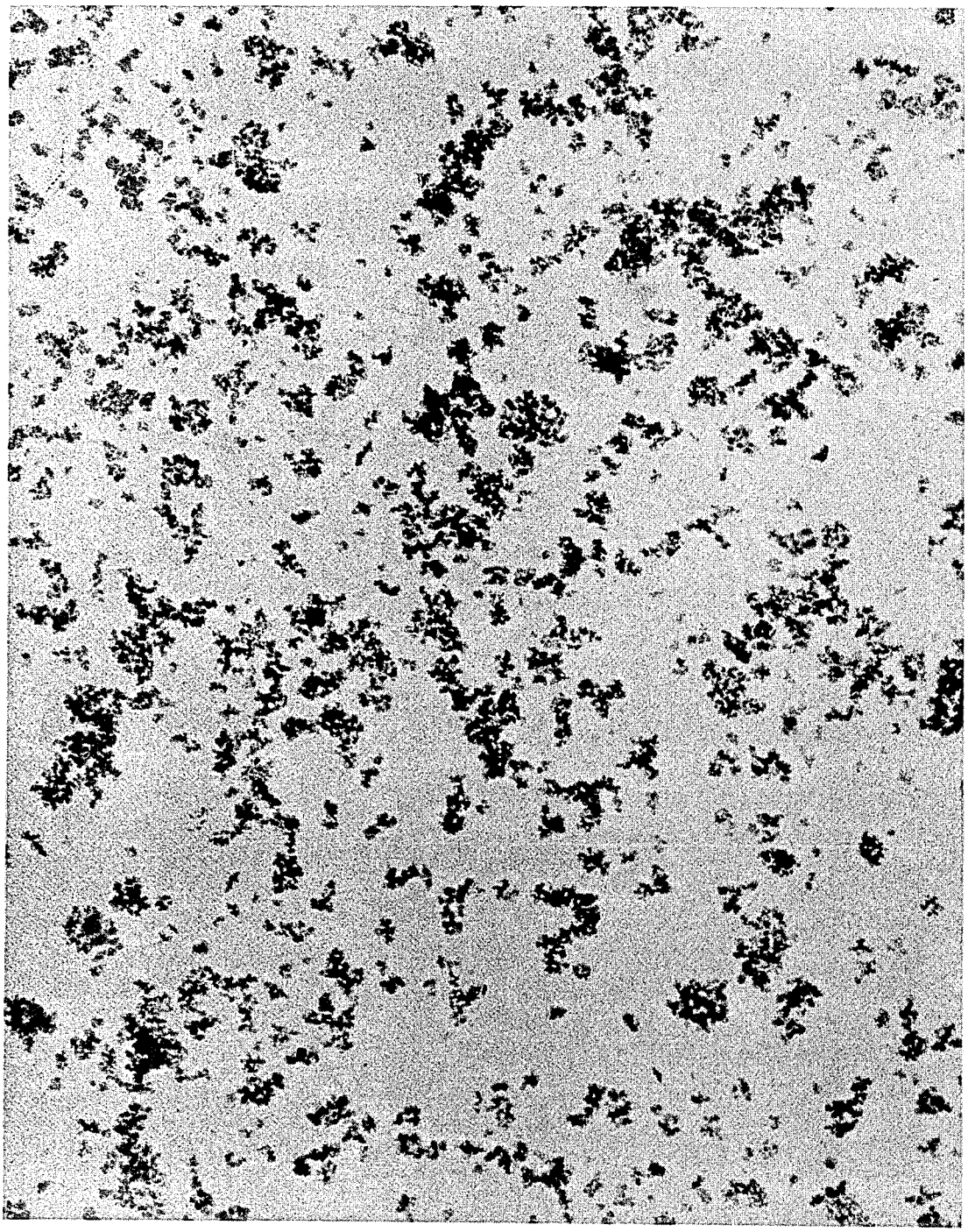
FIG. 1 is a microphotograph of an undoped silicon dioxide annealed at 1000° C.
Figure 2:
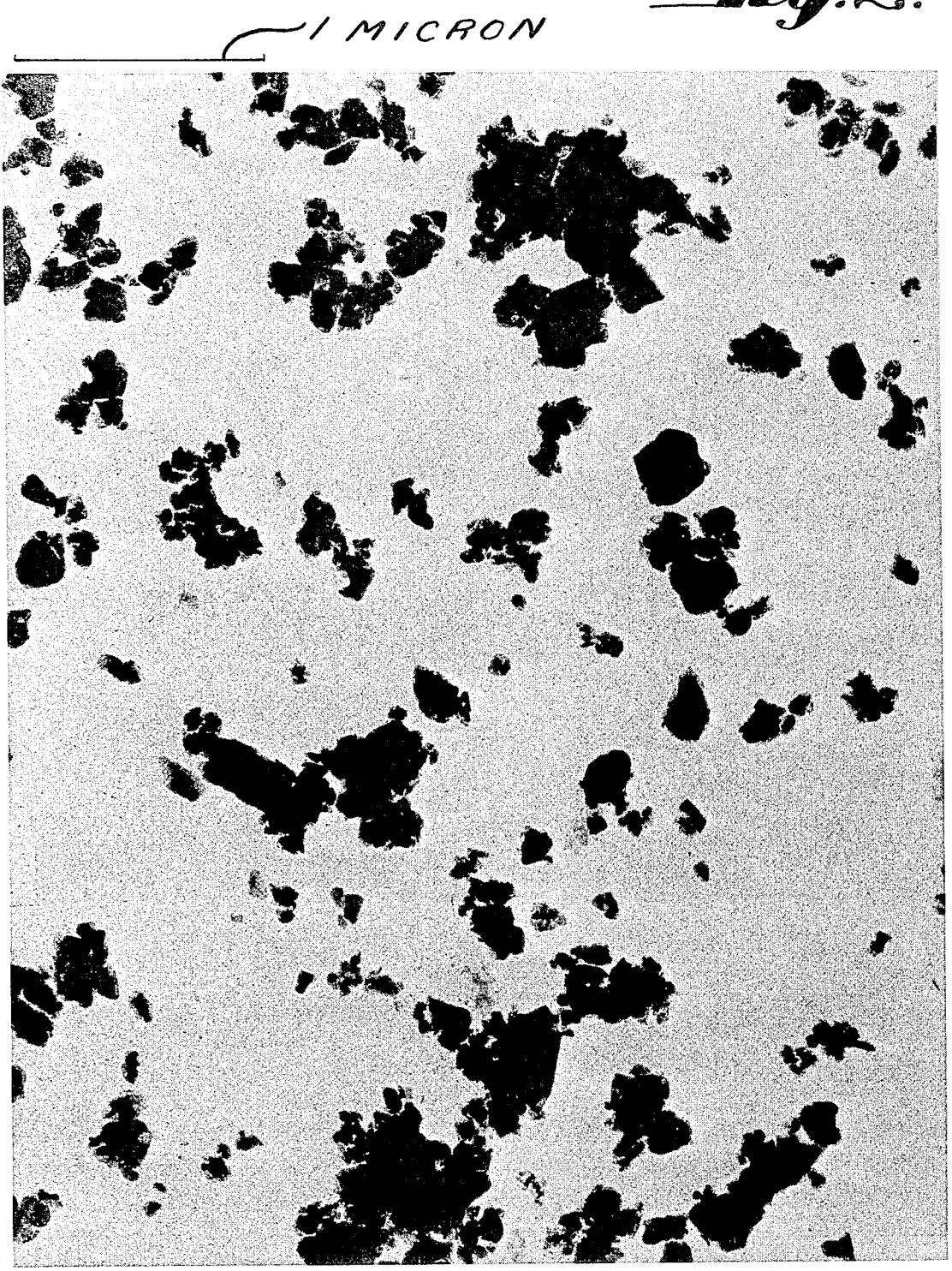
FIG. 2 is a microphotograph of the undoped silicon dioxide annealed at 1150° C.

When the product was annealed for 3 hours at 1000° C. there was no increase in particle size as can be seen from FIG. 1.

However, when this product was heated for 3 hours to 1150° C. then the BET surface area fell to 12 m$^2$/g and the average particle diameter was in the range between 50 and 300 nm. Besides the annealed product had sintered together considerably through which the bulk density of the again disaggregated material had increased from 25 g/l to 286 g/l. As a result thereof the thermal conductivity also increased in comparison to an unannealed article from $1.4 \times 10^{-2}$ W/m×°K (Watts/meters×°Kelvin) to $6.8 \times 10^{-2}$ W/m×°K, measured according to DIN 52616 (German Industrial Standard 52616) at a bulk at 80°/20° C. and a load of 15 g/cm$^2$.

EXAMPLE 2

(According to the Invention)

The silica burner was operated under the conditions given in Example 1, however, there were injected into the mixing chamber in addition to the 3-component mixture 22.4 g/h of iron chloride (ferric chloride) vapor having a temperature of 400° C. The exit velocity from the burner changed only a trifle through this small amount of additive. The silica obtained was colored slightly red by the $Fe_2O_3$ content (0.5%). The specific surface area of the $Fe_2O_3$ doped silica was 300 m²/g. By annealing for three hours at 1150° C. this only fell to 90 m²/g and the average primary particle size merely increased a trifle from 7 nm to 12 nm. The annealed material was practically unsintered and also was substantially pourable without pulverization. The bulk density was 65 g/l. The thermal conductivity of the poured material was only increased from $1.43 \times 10^{-2}$ W/m×°K before the annealing to $2.37 \times 10^{-2}$ W/m×°K after the annealing at a load of 15 g/cm².

EXAMPLE 3

The procedure was as stated in Example 1 with the difference that there was fed into the burner mixture 7.1 grams of $ZrCl_4$ vapor per hour, which was produced by continuous entry of $ZrCl_4$ powder with the help of a microdosaging extruder into a small vaporizer electrically heated to 400° C. A small amount of carrier gas* was fed together with the zirconium chloride to the vaporizer. The silica obtained contained 0.2% zirconium dioxide and had a BET surface area of 296 m²/g. After annealing the material for 3 hours at 1150° C. it still had a specific BET surface of 124 m²/g and the average primary particle size had increased merely from 7 to 10 nm.

* carrier gas was dried air

Figure 3:
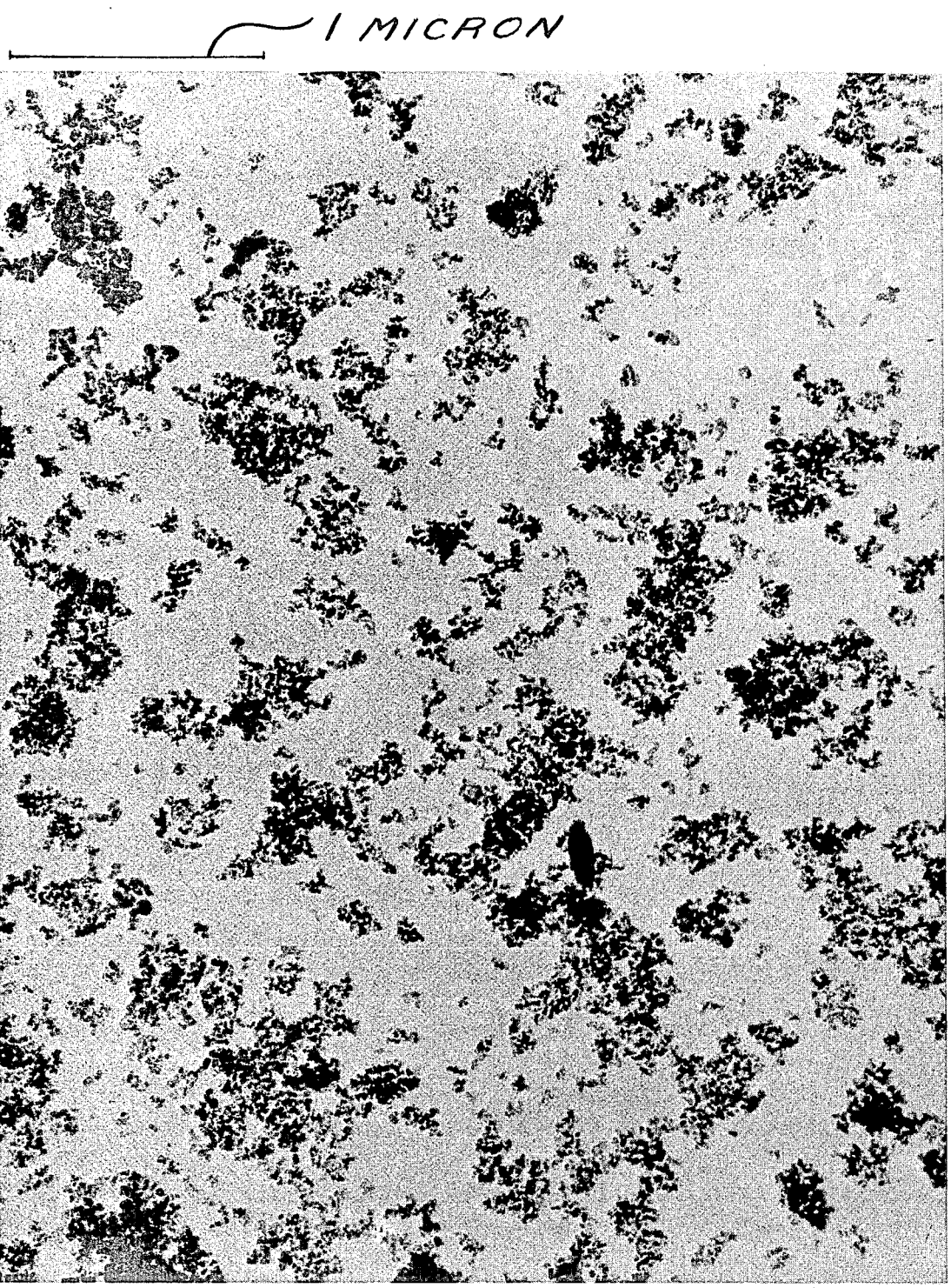
FIG. 3 is a microphotograph of the zirconium dioxide doped silicon dioxide of the invention produced in Example 3 and heated to 1150° C.

This product is shown in FIG. 3.

There were no sticking together noticeable in the annealed material and the bulk density through the thermal treatment had only changed from 35 g/l to 49 g/l, likewise the thermal conducticity of the poured material changed only unsubstantially. It was now $2.3 \times 10^{-2}$ W/m×°K at a loading of 15 g/cm².

EXAMPLE 4

The procedure was analogous to Example 1 but there was also mixed in 183 g/h of $TiCl_4$ vapor, whereby they resulted a silica having 3.6% $TiO_2$, a specific BET surface area of 280 m²/g and an average particle diameter of 10 nm.

The specific BET surface area of this silica fell off through a 3 hour annealing at 1150° C. to 40 m²/g at a primary particle size distribution between 50 and 60 nm.

The bulk density was 182 g/l. The heat conductivity increased through the annealing process to $4.3 \times 10^{-2}$ W/m×°K, thus about half that in comparison to undoped annealed material.

EXAMPLE 5

A silica produced according to Example 1 having an average primary particle size of 7 nm and a specific surface area of 300 m²/g was subsequently intensively mixed in a laboratory mixer with 0.5% of pyrogenic highly dispersed iron oxide ($Fe_2O_3$) and this mixture tempered for 10 hours at 900° C. Subsequently this mixture was annealed under the same conditions as in Example 1 to 4 at 1150° C. Thus there was obtained an annealed material having a specific surface area of only 14 m²/g and a primary particle diameter of 50-280 nm. This means that the subsequently mixing in of the iron oxide with the silica does not impart thermal stability.

The heat conductivity of the annealed material for that reason at $6.3 \times 10^{-2}$ W/m×°K was about the same as that produced in Example 1 and correspondingly annealed.

There is hereby incorporated by reference the entire disclosure of German No. P2931810.3-41.

What is claimed is:

1. Pyrogenically produced, temperature stabilized silicon dioxide-mixed oxide having a BET surface of 50 to 400 m²/g, the other component of the mixed oxide being 0.01 to 10 weight % zirconium dioxide or
0.01 to 10 weight % ferric oxide or
0.1 to 9.9 weight % titanium dioxide.

2. A mixed oxide according to claim 1 wherein the silicon dioxide is stabilized up to a temperature of 1150° C. against reduction in surface area to below 50 m²/g.

3. A mixed oxide according to claim 1 wherein said other component is zirconium dioxide.

4. A mixed oxide according to claim 3 containing about 0.2% zirconium dioxide.

5. A mixed oxide according to claim 4 having a BET surface area of 296 m²/g and an average particle diameter of about 7 nm.

6. A mixed oxide according to claim 5 which is capable upon heating to 1150° C. for 3 hours of still having a BET surface area of 125 m²/g and an average particle diameter of not over about 10 nm.

7. A mixed oxide according to claim 1 wherein said other component in ferric oxide.

8. A mixed oxide according to claim 7 containing about 0.5% $Fe_2O_3$.

9. A mixed oxide according to claim 8 having a BET surface area of about 300 m²/g and an average particle diameter of about 7 nm.

10. A mixed oxide according to claim 9 which is capable upon heating to 1150° C. for 3 hours to still having a BET surface area of 90 m²/g and an average particle diameter of not over about 12 nm.

11. A mixed oxide according to claim 1 wherein said other component is titanium dioxide.

12. A mixed oxide according to claim 11 containing about 3.6% $TiO_2$.

13. A mixed oxide according to claim 12 having a BET surface area of about 280 m²/g and an average particle diameter of not over about 10 nm.

14. A mixed oxide according to claim 13 which is capable upon heating to 1150° C. for 3 hours to still having an average particle diameter of not over about 60 nm.

15. A mixed oxide according to claim 2 wherein said other component is zirconium dioxide or ferric oxide and the mixed oxide has a thermal conductivity of about $1.4 \times 10^{-2}$ W/m×°K and which is capable on heating to 1150° C. for 3 hours of maintaining its thermal conductivity at not over about $2.4 \times 10^{-2}$ W/m×°K at a load of 15 g/cm.

16. A mixed oxide according to claim 2 wherein said other component is titanium dioxide and the mixed oxide has a thermal conductivity of about $1.4 \times 10^{-2}$ W/m×°K and is capable on heating to 1150° C. for 3 hours of maintaining its thermal conductivity at not over about $4.3 \times 10^{-2}$ W/m×°K at a load of 15 g/cm.

17. A mixed oxide according to claim 15 wherein said other component is zirconium dioxide.

18. A mixed oxide according to claim 15 wherein said other component is ferric oxide.

19. A process of preparing a stabilized silicon dioxide-mixed oxide having a BET surface of 50 to 400 m$^2$/g, the other component of the mixed oxide being 0.01 to 10 weight % zirconium dioxide or 0.01 to 10 weight % ferric oxide or 0.1 to 9.9 weight % titanium dioxide and wherein the silicon dioxide is stabilized up to a temperature of 1150° C. against reduction in surface area to below 50 m$^2$/g, comprising vaporizing silicon tetrachloride, diluting it with preheated air in the ratio of 0.5 to 1.2 kg of silicon-tetrachloride to 0.8 to 1.2 Nm$^3$ of air, supplying it to a burner having a mixing chamber, mixing the diluted silicon tetrachloride in the mixing chamber with hydrogen and vapor form ferric chloride, zirconium tetrachloride or titanium tetrachloride in the ratio as to give an silicon dioxide-other component mixed oxide containing 0.01 to 10% zirconium dioxide or 0.1 to 10% ferric oxide or 0.1 to 9.9% titanium dioxide, and wherein the ratio of hydrogen to the total of silicon tetrachloride and the chloride of the other element is 0.8 to 1.5 Nm$^3$ of hydrogen to 2.8 to 3.3 kg of total chlorides, buring the 4-component mixture in a reaction chamber, separating the solid silicon dioxide-mixed from the gaseous reaction products and freeing the solid silicon dioxide-mixed oxide from adhering hydrogen chloride by heating in moist air.

20. A mixed oxide prepared by the process of claim 19.

21. A mixed oxide according to claim 20 wherein the other component is ferric oxide.

22. A mixed oxide according to claim 20 wherein the other component is zirconium dioxide.

23. A mixed oxide according to claim 20 wherein the other component is titanium dioxide.

24. A process according to claim 19 wherein the ratio of silicon tetrachloride to air is 0.8 to 0.95 kg of silicon tetrachloride to 0.9 to 1.1 Nm$^3$ and the ratio of hydrogen to total chloride is 0.9 to 1.2 Nm$^3$ of hydrogen to 2.9 to 3.3 Kg of total chlorides.

25. A process according to claim 19 wherein the air is heated to 120° to 180° C.

26. A mixed oxide according to claim 11 containing about 3.6 to 9.9% of TiO$_2$.

* * * * *